United States Patent [19]

Fukutake et al.

[11] Patent Number: 4,633,990

[45] Date of Patent: Jan. 6, 1987

[54] STRUCTURE FOR SUPPORTING A DIAPHRAGM SPRING

[75] Inventors: Heiji Fukutake, Toyonaka; Shozo Iwata, Minamisumiyoshi, both of Japan

[73] Assignee: Kabushiki Kaisha Daikin Seisakusho, Osaka, Japan

[21] Appl. No.: 703,473

[22] Filed: Feb. 20, 1985

[30] Foreign Application Priority Data

Feb. 27, 1984 [JP] Japan .................................. 59-27667

[51] Int. Cl.⁴ ............................................. F16D 13/44
[52] U.S. Cl. ................................. 192/70.27; 192/89 B
[58] Field of Search ............................ 192/89 B, 70.27

[56] References Cited

U.S. PATENT DOCUMENTS

| 3,939,951 | 2/1976 | Sink et al. | 192/89 B |
|---|---|---|---|
| 4,211,315 | 7/1980 | Fenart | 192/89 B X |
| 4,399,897 | 8/1983 | Billet et al. | 192/89 B |
| 4,562,910 | 1/1986 | Maycock | 192/70.27 |

FOREIGN PATENT DOCUMENTS

| 2441141 | 3/1975 | Fed. Rep. of Germany | 192/89 B |
|---|---|---|---|
| 2334009 | 7/1977 | France | 192/89 B |
| 2044866 | 10/1980 | United Kingdom | 192/89 B |
| 2068062 | 8/1981 | United Kingdom | 192/89 B |

Primary Examiner—Rodney H. Bonck
Attorney, Agent, or Firm—Burns, Doane, Swecker & Mathis

[57] ABSTRACT

The present disclosure described a structure for supporting a diaphragm spring in a clutch comprising a diaphragm adapted to force a pressure plate and provided with slits radiately extending from the inner periphery of the spring; tabs extending from a clutch cover through radially outer portions of the slits; and a pair of wire employed as fulcrum for said spring and supported by said tabs; characterized in that; said tabs are provided with straight portions extending substantially perpendicular to the spring and engaging with the outer peripheries of the recesses, respectively, and each straight portion is provided at the side with protrusions protruding toward a portion of the inner side edge of the recess distant from the corner between the inner side edge and the outer periphery of the recess.

4 Claims, 5 Drawing Figures

STRUCTURE FOR SUPPORTING A DIAPHRAGM SPRING

BACKGROUND AND SUMMARY OF THE INVENTION

The present invention relates to a structure for supporting a diaphragm spring employed in a friction clutch for an automobile and others.

A conventional friction clutch basically has a structure as shown in FIG. 1. In FIG. 1, a frictional facing 3 is positioned between a flywheel 1 of an engine and an annular pressure plate 2. The facing 3 is fixed to an outer peripheral portion of a clutch disc 5 connected to an output shaft 4 (only a center line thereof is illustrated). When the pressure plate 2 presses the facing 3 onto the flywheel 1, the clutch engages and a torque is transmitted from a flywheel 1 through the disc 5 to the output shaft 4. A diaphragm spring 6 for forcing the pressure plate 2 toward the facing 3 is disposed at the rear of the pressure plate 2 opposite to the disc 5. The outer peripheral portion of the spring 6 is seated on a projection 7 on the rear surface of the pressure plate 2. When the inner peripheral portion of the spring 6 is pushed by a release bearing 8 toward the disc 5, the spring 6 elastically deforms into a shape shown by a phantom line 6a and releases the force against the pressure plate 2, so that the clutch disengages. The outer periphery and the rear surface of the spring 6 are covered by a clutch cover 10. The clutch cover 10 includes a substantially annular end wall 11 and a cylindrical peripheral wall 12 which inclines and projects from the outer periphery of the end wall 11 toward the flywheel 1 and is fixed at the end thereof to the flywheel 1.

The end wall 11 is provided at the inner periphery with circumferentially spaced integral projections or tabs 13. The tabs 13 are bent and projected from the end wall 11 toward the pressure plate 2 through recesses 15 of the spring 6, respectively. Free ends 14 of the tabs 13 are positioned between the pressure plate 2 and the spring 6. A pair of wire rings 19 and 20 are disposed at the outside, in the radial direction of the spring 6, of the tabs 13. The wire rings 19 and 20 form fulcrums for the spring 6. The projections or tabs 13 support the radially inner peripheries and the sides opposite to the spring 6 of the wire rings 19 and 20. The wire ring 19 is disposed between the spring 6 and the wall 11, and the wire ring 20 is disposed between the spring 6 and the ends 14 of the tabs 6.

As shown in FIG. 2, the spring 6 is provided with slits 16 which extend radially from the inner periphery to the radially middle or outer portion of the spring 6. The recesses 15 are formed by the radially outer ends of the slits 16 which are recessed and widened in the circumferential direction of the spring 6.

In the conventional clutch described above, it is impossible to avoid the rotation of the spring 6 relative to the clutch cover 10 which is caused by various vibration source including the engine, and thus, the tabs 13 collide against the edges of the recesses 15. And, in the conventional structure, the tabs 13 collide, in the linear contact condition, against round corners 23 between inner peripheral edges 21 extending in the circumferential direction of the spring 6 and inner side edges 22 extending substantially in the radial direction of the spring 6. The linear contact condition described above generates a very strong pressure between the tabs 6 and the round corners 23, so that the collided portions may be remarkably abraded and bite into each other, which reduces stability of the operation characteristic of the clutch and prevents smooth and light operation of the clutch. Further, in the known structure, the tabs 13 may deform and the wire rings 19 and 20 may deviate radially from the correct positions, which also may reduce the stability of the characteristic of the clutch.

Accordingly, it is an object of the invention to provide an improved structure, overcoming the above-noted problems, in which structures of projections or tabs of a clutch cover for supporting wire rings are improved.

According to the invention, a structure for supporting a diaphragm spring in a clutch comprises a diaphragm adapted to force a pressure plate provided with slits radially extending from the inner periphery of the spring; tabs extending from a clutch cover through radially outer portions of the slits; and a pair of wire rings employed as fulcrums for said spring and supported by said tabs; and is characterized in that; said tabs are provided with straight portions extending substantially perpendicular to the spring and engaging with the inner peripheries of the recesses, respectively, and each straight portion is provided at the side with protrusions protruding toward a portion of the inner side edge of the recess distant from the corner between the inner side edge and the inner periphery of the recess.

Other and further object, features and advantages of the invention will appear more fully from the following description of the preferred embodiments of the invention.

DETAILED DESCRIPTION OF THE PREFERRED EMBODIMENTS

Figure 1:
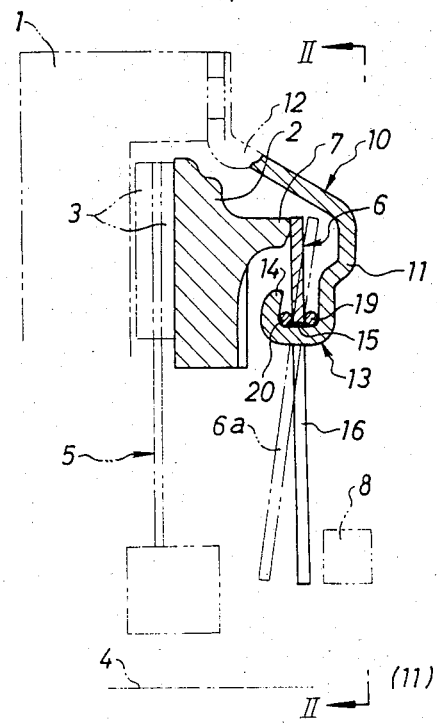
FIG. 1 is a fragmentary schematic sectional view of a conventional clutch.
Figure 2:
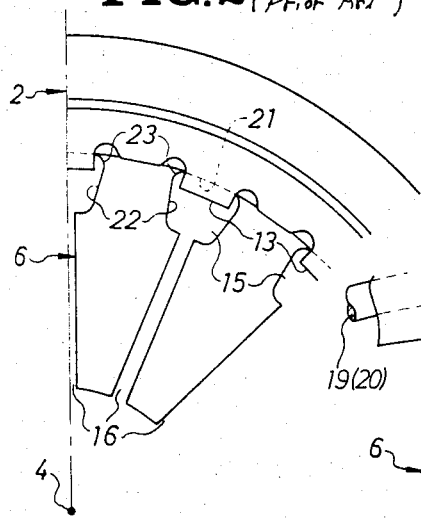
FIG. 2 is a fragmentary schematic rear view taken along line II—II in FIG. 1.
Figure 3:
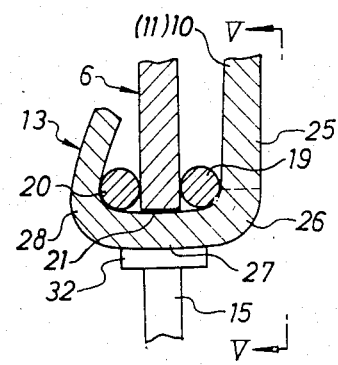
FIG. 3 is an enlarged fragmentary schematic sectional view of an embodiment of the invention.

Referring to FIG. 3, which is similar to an enlarged fragmentary view of FIG. 1, the same members and parts as those in FIG. 1 bear same reference numbers, and they will not be described in details hereinafter. In FIG. 3, a tab 13 comprises a base end portion 26, a straight portion 27 and a free end portion 28. The base end portion 26 is bent and curved from an inner periphery 25 of an end wall 11 of a clutch cover 10 toward a pressure plate 2 (FIG. 1). The straight portion 27 extends from the base end portion 26 toward the pressure plate 2 through a recess 15 in a diaphragm spring 6. The free end portion 28 is bent and curved from the straight portion 27 in the radially outward direction of the spring 6. The base and free ends 26 and 28 hold and support a pair of wire rings 19 and 20 from the opposite sides to the spring 6. Both end portions of the straight portion 27 connecting to the end portions 26 and 28 support the radially inner peripheries of the wire rings 19 and 20. The straight portion 27 has a substantially plane shape as a whole, extends substantially perpendicular to the spring 6 and engages with a inner peripheral edge 21 of a recess 15.

Figure 4:
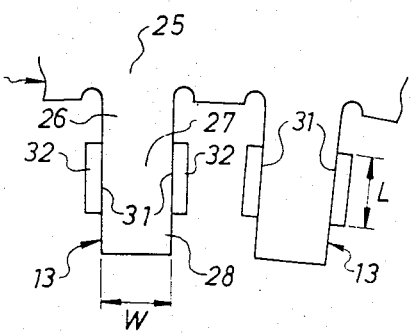
FIG. 4 is a fragmentary schematic developed view of a tab in FIG. 3.

Referring to FIG. 4 which is a fragmentary schematic developed view of a tab 13, in other words, is a plan view of the tab 13 before bending the base and free end portions 26 and 28, the main part of the tab 13 has a substantially constant width W through whole length thereof. However, a pair of bent protrusions 32 are integrally formed at the side edges 31 of the main part of the straight portion 27 having a length L. The projections 32 are bent at the same time as the forming such as shearing of the tab 13, and are inclined with respect to the straight portion 27 as will be described below.

Figure 5:
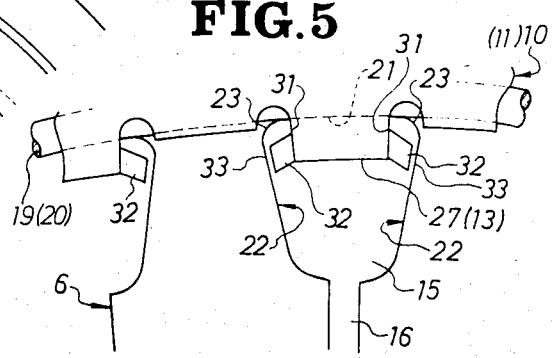
FIG. 5 is a fragmentary schematic rear view taken along line V—V in FIG. 3.

Referring to FIG. 5, said recess 15 of this embodiment has substantially same configuration, e.g., a sector or square, as the conventional recess. A pair of inner side edges 22 extend in a nearly radial direction of the spring 6 from both ends of an inner peripheral edge 21 toward slit 16 of the spring 6. Corners 23 of an arc shape are formed between the inner peripheral edge 21 and the inner side edges 22, respectively. The side edges 31, which are folds, of the main part of the straight portion 27 are circumferentially adjacent to the corners 23 with spaces therebetween. However, the protrusions 32 are inclined with respect to the side edges 22, and protrude from the side edges 31 or folds toward the portions 33 of the inner side edges 22 adjacent to the corners 23. In the illustrated initial or assembled condition before using, narrow spaces are formed between the inner side edges 22 and the ends of the protrusions 32.

An operation is as follows. In the driving condition, the spring 6 is turned with respect to the clutch cover 10 by a load and vibration. This turning is easily caused when the pressure of the wire rings 19 and 20 to the tabs 13 is reduced by the wear of the rings 19 and 20 after a long use. When the spring 6 is turned, the protrusion 32 collides with the inner edge of the recess 15. However, the protrusion 32 collides not with the curved corner 23 but with the straight portion 33 of the inner side edge 22 in a planar contact condition, so that the pressure between the collided portions are small. Therefore, neither large abrasion nor biting are generated in the collided portions even after the long use, and thus, the spring 6 can always deform and incline smoothly with respect to the tabs 13 and the wire rings 19 and 20.

According to the invention, as stated hereinbefore, since the tabs 13 are designed to collide at the protrusions 32 of the straight portions 27 with the straight portions 33 of the inner side edges 22 distant from the corners 23, neither large abrasion nor biting are generated in the collided portions of the spring 6 and the edges of the recesses even after the long use, and thus, the spring 6 can always deform and incline smoothly and lightly with respect to the tabs 13 and the wire rings 19 and 20. Further, the straight portions 27 having the integral protrusions 32 can have a large flexural strength, so that the straight portions 27 can be prevented from deformation when the plastic working is applied to other parts for the assembly of the clutch. Therefore, the straight portions 27 can always position and support the wire rings 19 and 20 accurately and coaxially to the output shaft 4, which also results in the stability of the operation characteristic of the clutch.

The present invention will be explained from other viewpoint.

The radially outer part (15) of the slit 16, through which the tab 13 extends, has to be wider than the radially inner portion of the slit 16, because a tool or the like is inserted through the part (15) for bending the tab 13. On the other hand, the width W of the main part of the tab 13 should be small so as to enable and facilitate the bending thereof, i.e., to prevent the unnecessarily large flexural strength. Therefore, it can not be avoided that there are long spaces formed between the side edges 31 of the straight portion and the inner side edges 22 of the recess, and thus, in the conventional structure, the diaphragm spring 6 moves through those long spaces and forcefully collides against the edges of the recesses 15.

However, in the present invention, the protrusions 32 reduce the spaces between the tabs 13 and the edges 22 of the recesses 15. Therefore, when the diaphragm spring 6 turns with respect to the clutch cover 10, the spring 6 does not turn through the long space and the forceful collison is prevented. Further, since the protrusions 32 are provided only at the side edges 31 of the straight portions 27, the protrusions 32 do not substantially increase the flexural strength of the base ends 26 and the free ends 28. Therefore, the tabs 13 can be bent easily in the assembling operation, although the tabs 13 are provided with the protrusions 32.

Although the invention has been described in its preferred form with a certain degree of particularity, it is understood that the present disclosure of the preferred form may been changed in the details of construction and the combination and arrangement of parts may be resorted to without departing from the spirit and scope of the invention as hereinafter claimed.

What is claimed is:

1. A structure for supporting a diaphgragm spring in a clutch comprising a pressure plate; a clutch cover covering the rear of the pressure plate; a diaphragm spring disposed between the pressure plate and the clutch cover for forcing the pressure plate and provided with slits radially extending from the inner periphery of the spring; tabs extending from the inner periphery of the clutch cover through radially outer portions of the slits; and a pair of wire rings employed as fulcrums for said spring and supported by said tabs from the radially inner side and the respective sides opposite to the spring; said radially outer portions of the slits through which the tabs extend being formed into recesses which are wider than other portions of the slits so that a tool for bending the tabs can be inserted therethrough;

said recesses defining an outer periphery and inner side edges with arc-shaped corners;

said tabs are provided with straight portions extending substantially perpendicular to the spring and engaging the outer peripheries of the recesses, respectively, and each straight portion is provided at each side with a protrusion protruding toward a corresponding inner side edge of the recess distant from a corner between the inner side edge and the outer periphery of the recess, said protrusions extending in a radially inward direction from the straight portion so that planar contact occurs between the protrusion and the corresponding inner side edge.

2. A structure for supporting a diaphragm spring in a clutch of claim 1 wherein said inner side edge of the recess is straight, and an edge surface of the protrusion is adapted to contact the inner side edge of the recess in the planar contact condition when the diaphragm spring turns relatively to the clutch cover.

3. A structure for supporting a diaphragm spring in a clutch of claim 1 wherein said protrusion is integrally provided at the tab and is bent with respect to the straight portion so that the protrusion may increase the flexural strength of the straight portion.

4. A structure for supporting a diaphragm spring in a clutch of claim 1 wherein said protrusion is integrally formed only at both side of the straight portion between a bent base end and a bent free end of the tabs.

* * * * *